(12) United States Patent
Stickle (10) Patent No.: US 7,284,141 B2
(45) Date of Patent: Oct. 16, 2007

(54) METHOD OF AND APPARATUS FOR MEASURING JITTER AND GENERATING AN EYE DIAGRAM OF A HIGH SPEED DATA SIGNAL

(75) Inventor: Kyle Stickle, San Jose, CA (US)

(73) Assignee: Anritsu Company, Morgan Hill, CA (US)

( * ) Notice: Subject to any disclaimer, the term of this patent is extended or adjusted under 35 U.S.C. 154(b) by 457 days.

(21) Appl. No.: 10/772,521

(22) Filed: Feb. 5, 2004

(65) Prior Publication Data

US 2005/0177758 A1 Aug. 11, 2005

(51) Int. Cl.
*G06F 1/12* (2006.01)
(52) U.S. Cl. .................. 713/400; 368/202; 702/117; 375/360
(58) Field of Classification Search ........... 713/400; 368/202; 702/117; 375/360
See application file for complete search history.

(56) References Cited

U.S. PATENT DOCUMENTS

| | | | |
|---|---|---|---|
| 4,678,345 A | 7/1987 | Agoston | |
| 4,812,769 A | 3/1989 | Agoston | |
| 5,959,479 A | 9/1999 | Woodward | |
| 6,598,004 B1 | 7/2003 | Ishida | |
| 6,629,272 B1 | 9/2003 | Jungerman | |
| 6,775,339 B1 * | 8/2004 | Wildes et al. | 375/354 |
| 6,810,346 B2 * | 10/2004 | Nygaard et al. | 702/117 |
| 6,917,659 B1 * | 7/2005 | Dunning et al. | 375/360 |
| 2003/0086339 A1 * | 5/2003 | Dally et al. | 368/202 |
| 2005/0171717 A1 * | 8/2005 | Poskatcheev et al. | 702/117 |
| 2005/0246601 A1 * | 11/2005 | Waschura | 714/724 |

OTHER PUBLICATIONS

Fractional-N synthesizer, David Owen.*

* cited by examiner

*Primary Examiner*—Thuan N. Du
*Assistant Examiner*—Fahmida Rahman
(74) *Attorney, Agent, or Firm*—Fliesler Meyer LLP (57) ABSTRACT

A sampling system is disclosed which measures high speed data signals by performing sampling events at intervals determined by a programmable DDS output frequency and a programmable counter. The reference frequency of the DDS is that of a clock signal that is synchronous with the data signal to be measured. The present invention is able to arrange the sample points to form an eye diagram of the input signal. In addition, the present invention is capable of sampling synchronously with the data clock and controlling the phase of the synthesized signal such that the samples are localized around the rising and falling edges of the data waveform. The present invention is thereby able to determine the location of the edges of the data signal and analyze the deterministic jitter of the waveform.

2 Claims, 5 Drawing Sheets

METHOD OF AND APPARATUS FOR MEASURING JITTER AND GENERATING AN EYE DIAGRAM OF A HIGH SPEED DATA SIGNAL

FIELD OF THE INVENTION

The present invention is related to measuring high speed data signals in general, and to a method and apparatus for generating an eye diagram from high speed data signals and measuring jitter components in the high speed data signals.

BACKGROUND OF THE INVENTION

Equivalent time sampling oscilloscopes use undersampling of periodic high speed data waveforms to produce an eye diagram. An eye diagram is a superposition of the various logic states of a data waveform and is a common way to assess the integrity of the signal. Particularly, an eye diagram is a useful means for readily obtaining information regarding voltage swing and transition time of the incoming data. However, the various forms of jitter are not well characterized with eye diagrams.

Jitter is the general term used to describe the noise or uncertainty in the period of incoming data in a communications system. In an ideal communications system, bits arrive at time increments that are integer multiples of a bit repetition time. However, in a real-world system, data pulses arrive at times that deviate from these integer multiples. This deviation may case errors in the transmission of data, particularly when the data is transmitted at high speeds.

Jitter is composed of intersymbol interference (ISI), duty-cycle distortion (DCD), periodic jitter (PJ) and random jitter (RJ). ISI is caused by data path propagation delay which is a function of past data history and can be caused by transmission line reflections. DCD can be caused by propagation delay differences between low to high and high to low transitions. DCD is manifested as a deviation from a 50% duty cycle. PJ is cyclic jitter that is caused by sinusoidal interference. RJ is the remaining random component of the jitter and is assumed to have a Gaussian distribution. In the relation to the present discussion, ISI, DCD and PJ are referred to as deterministic jitter.

Jitter is a problem of particular importance in digital communication systems and can cause the received signal to be sampled at a non-optimal sampling point. This increases the bit-error ratio at the receiver and thus limits the data rate. In conventional systems, each receiver typically extracts its clock from the incoming data signal. Jitter makes this task significantly more difficult.

Existing sampling oscilloscopes rely on sequential delay generators to delay sampling events relative to a trigger event, causing the trace to build up from left to right across the display. The existing system requires a well characterized sequential time delay generator. Time delay generators are adversely influenced by temperature variations and are inaccurate when long time delays are required. To analyze the deterministic jitter of a data pattern, the location of the rising and falling edges of the waveform must be known. One of the problems with sampling systems utilizing time delay generators is that the time delay to edges far from the trigger can be long, particularly in longer patterns. The long delay causes a significant amount of inaccuracy in the sequential delay generator.

Figure 1:
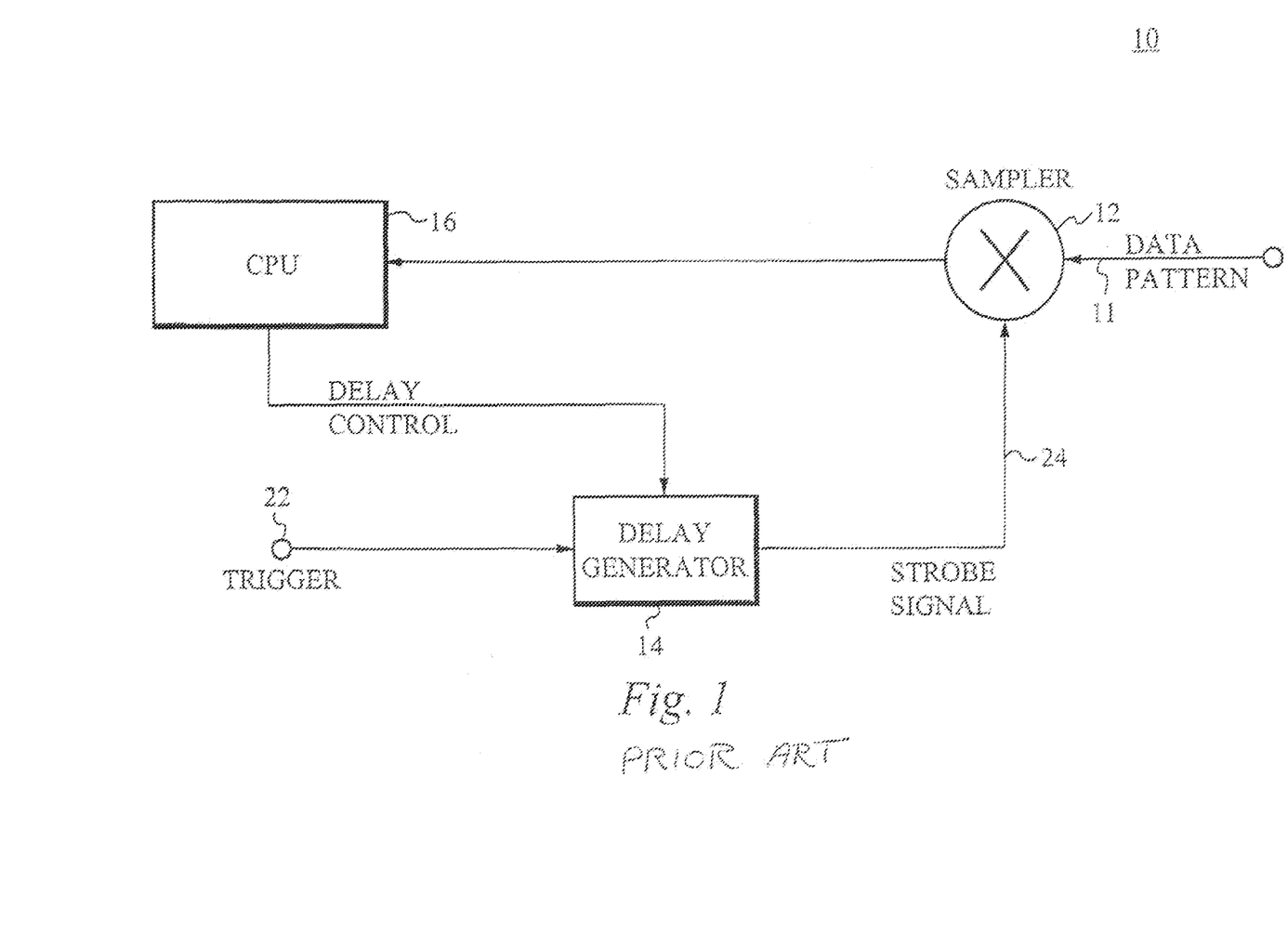
FIG. 1 illustrates a block diagram of a prior art sampling system.

FIG. 1 illustrates a block diagram of such a prior art sampling system 10. The input waveform 11 to be sampled is applied to the input of a sampler 12. The times at which the waveform is sampled is determined by a trigger signal 22 and sequential delay generator 14. The delay generator adds incrementally increasing delay times to the trigger signal 22 and sends sampling strobe signals 24 to the sampler 12. Upon receiving the strobe signals, the sampler 12 produces a value that is representative of the amplitude of the input waveform and sends this value to the CPU 16 for processing. As sample points are gradually collected at increasing times from the trigger signal 22, the waveform is acquired. The system 10 in FIG. 1, as stated above, has disadvantages. For instance, the system requires that the sequential delay generator 14 be well characterized. In addition, the system 10 has unwanted temperature dependencies and other inaccuracies, particularly when long delay times are added to the trigger signal. Therefore the system 10 in FIG. 1 cannot be used to accurately measure deterministic jitter in long patterns.

Figure 2:
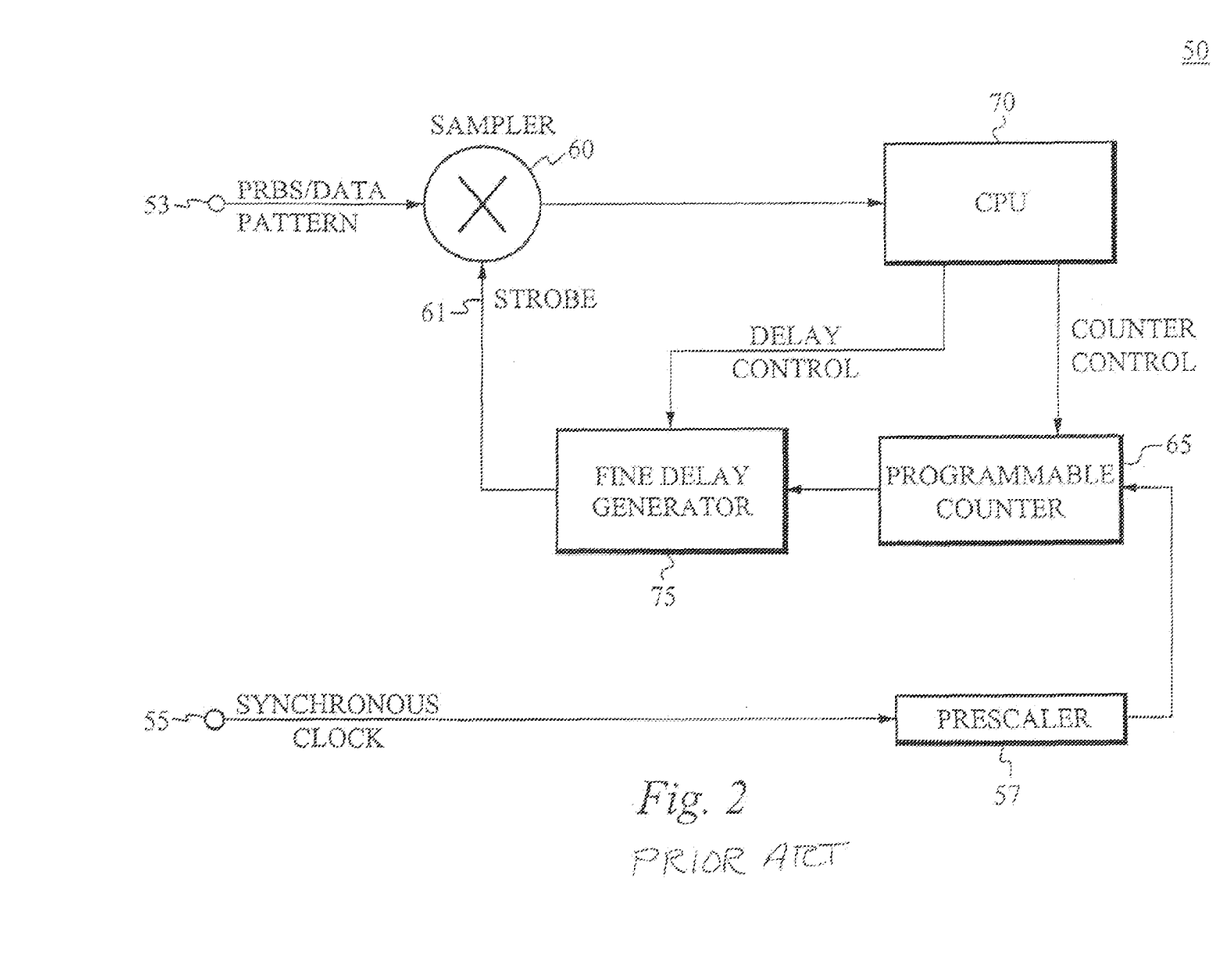
FIG. 2 illustrates a block diagram of a prior art sampling system.

Another known sampling system uses a counter in conjunction with a fine delay generator. This system uses the data clock instead of a trigger signal to generate the sample events. The counter can be used to count many clock cycles to generate long delays, thereby eliminating the inaccuracies associated with long delays using a sequential time delay generator mentioned above. FIG. 2 illustrates a block diagram of such a prior art sampling system 50. The input waveform 53 to be sampled is applied to the input of a sampler 60. The times at which the waveform is sampled is determined by a synchronous clock 55, prescaler 57, programmable counter 65 and fine delay generator 75. The prescaler 57 divides the synchronous clock 55 down to a frequency that is within the frequency range of the counter 65. The counter 65 and fine delay generator 75 are programmed to progressively vary the time delay of the strobe signals 61 sent to the sampler. Upon receiving a strobe signal, the sampler 60 produces a value that is representative of the amplitude of the input waveform 53 and sends this value to the CPU 70 for processing. As sample points are gradually collected, the waveform is acquired. While the system 50 in FIG. 2 does not have the problem of inaccurate long delays as with the system in FIG. 1, the fine delay generator must still be well characterized. In addition, the sample rate for long patterns becomes exceedingly slow, thereby making deterministic jitter measurements of long patterns unnecessarily time consuming.

There is a need for a versatile sampling system that performs a novel method of measuring high data rate digital waveform signals and producing eye diagrams from the measurements. What is also needed is a versatile sampling system capable of performing jitter analysis of DCD and ISI jitter components when measuring the high-speed digital signals.

SUMMARY OF THE INVENTION

One embodiment of the present invention is directed to an apparatus which samples an input signal and receives a clock signal synchronous with the input signal. The apparatus comprises a synthesizer which receives the synchronous clock signal. The synthesizer produces a synthesized signal that has a frequency which is dependent on the synchronous clock signal. The apparatus includes a sampling module that is coupled to the synthesizer, wherein the sampling module samples the input signal based on the synthesized signal frequency. The apparatus further comprises a counter that is coupled to the synthesizer and the sampling module, wherein the counter sends a strobe signal to the sampling module after a predetermined amount of counts.

Another embodiment of the present invention includes an apparatus for analyzing an input signal and receiving a clock signal that has a clock frequency synchronous with the input signal. The apparatus comprises a synthesizer for receiving the clock signal, wherein the synthesizer produces a signal which has a frequency dependent on the clock frequency. The apparatus includes a counter that is coupled to the synthesizer, whereby the counter receives the signal and produces a strobe signal. The apparatus includes a sampling module which is coupled to the counter, whereby the sampling module samples the input signal upon receiving the strobe signal and a processor that is coupled to the sampling module. The processor analyzes a sample point from the sampling module and arranges the sample point in a desired configuration.

The apparatus further comprises a processing unit that is coupled to the sampling module, wherein the processing unit analyzes the sampled point from the sampling module and arranges the sampled point in an eye diagram. The eye diagram is formed by arranging an x-coordinate of a particular sampling point using the function:

$$x(i) = \mathrm{mod}(R \cdot C \cdot i, N)$$

wherein C is the predetermined number of counts and i is the particular sampling point. The synthesizer signal frequency is programmed as the function $$F_{DDS} = \frac{1}{R} \cdot \left(\frac{N}{N+1}\right) F_{CLK}$$

wherein R is an integer, N is an amount of sampling points per unit interval and $F_{CLK}$ is the clock frequency. The apparatus further comprises a processing unit coupled to the synthesizer, wherein the processing unit controls the synthesizer signal frequency. The processing unit is coupled to the counter, wherein the processing unit controls the predetermined number of counts. A prescaler module is coupled to the synthesizer and the synchronous clock signal, wherein the prescaler module adjusts the synchronous clock signal to an acceptable clock frequency to be input into the synthesizer.

In another embodiment, a method of analyzing an input signal comprising: receiving a clock signal synchronous with the input signal; generating a synthesized signal from the clock signal, wherein the synthesized signal has a synthesized signal frequency; and sampling the input signal dependent on the synthesized signal frequency. The method further comprises adjusting the clock signal to an acceptable clock frequency to generate the synthesized signal. The input signal preferably is sampled at a sampling point after a predetermined number of counts, C.

Yet, another aspect of the invention is directed to a method of analyzing deterministic jitter of a repetitive input signal having a length of L bits. The method comprises receiving a clock signal synchronous with the input signal; generating a synthesized signal from the clock signal, wherein the synthesized signal has a synthesized signal frequency of preferably the function:

$$F_{DDS} = \frac{1}{R} \cdot F_{CLK}$$

The method includes sampling the input signal at a plurality of sampling points, wherein the input signal is sampled dependent on the synthesized signal frequency. The method comprises adjusting a phase of the synthesized signal frequency such that the plurality of sampling points are located on one or more edges of the input signal; calculating a bit edge value preferably using function:

$$B(i) = \mathrm{mod}(R \cdot C \cdot i, L)$$

for each sampling point in the plurality; averaging the sampling points; and calculating a deterministic jitter component, such as Duty Cycle Distortion and/or Intersymbolic Interference jitter. The method further comprises adjusting the clock signal to an acceptable clock frequency to generate the synthesized signal. The input signal is preferably sampled at each sampling point after a predetermined number of counts, C.

DETAILED DESCRIPTION OF THE PRESENT INVENTION

The present invention discloses a method and apparatus for analyzing high-speed data signals and arranging the analyzed data. In general, the present invention performs sampling of incoming signals by utilizing a synthesized signal generated from the reference clock frequency and a counter to generate sampler strobe signals. The present invention uses a technique for arranging the sampled data to form an eye diagram. The timing of the sample events is preferably controlled by the programmable output frequency of a Direct-Digital-Synthesizer (DDS) and the count interval of a programmable counter. To perform an eye-diagram measurement, the DDS output is set to a frequency that is a fraction of the clock frequency. This frequency is chosen such that appropriate arrangement of the sample points produces an eye diagram having the desired resolution. In addition, the present invention is capable of measuring the Duty Cycle Distortion (DCD) and Intersymbol Interference (ISI) jitter of the incoming signal. To perform DCD and ISI measurements, the output frequency of the DDS is chosen such that the sample events occur at the same time in the bit period or "unit interval". The phase-control feature of the DDS is used to align sample events with the edges of the data pattern. This makes it possible to find the threshold crossing of each edge, and thus measure the ISI and DCD jitter components. A technique for indexing the edges of the measured waveform is utilized by the present invention to keep track of the various edges in the data pattern.

Figure 3:
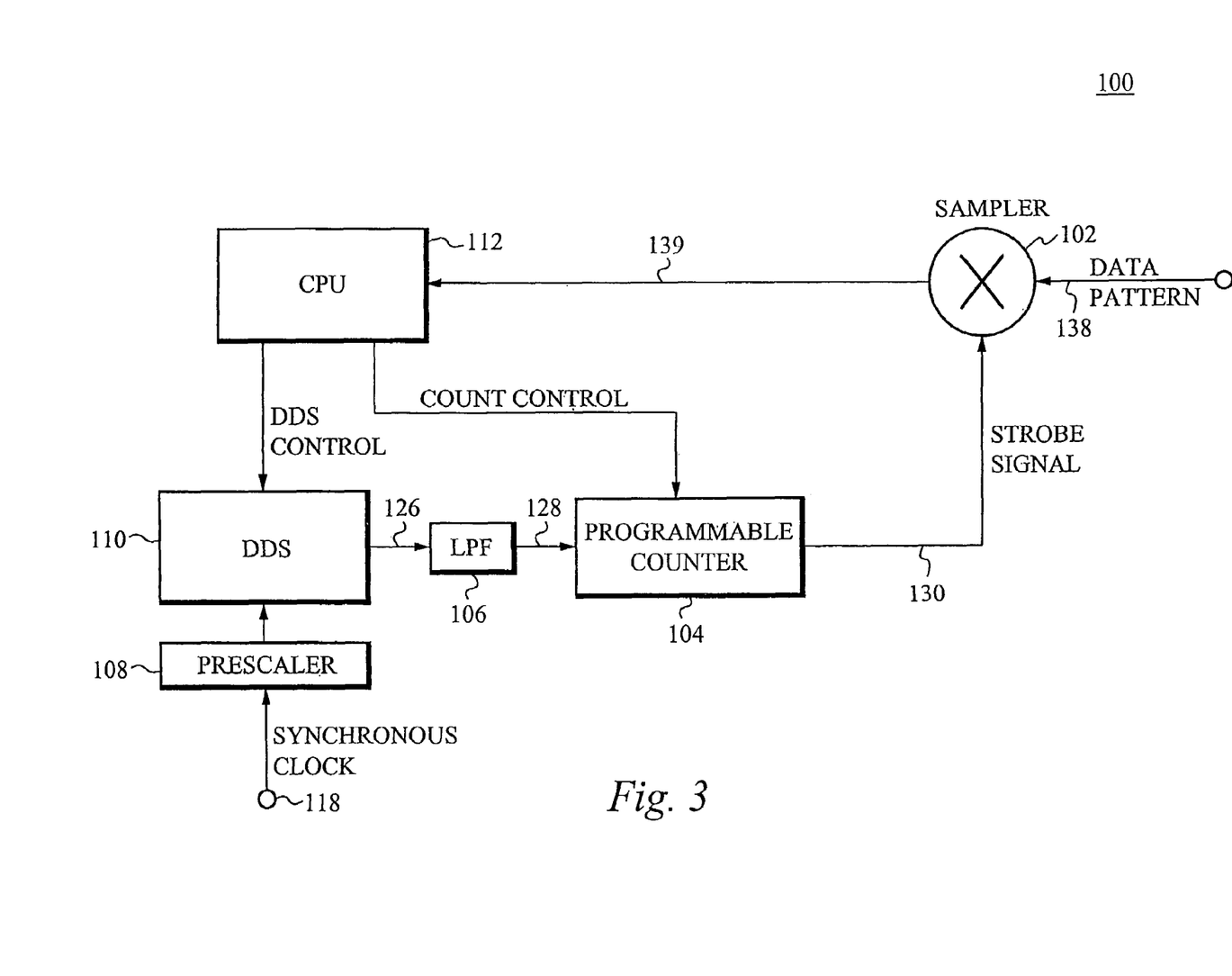
FIG. 3 illustrates a block diagram of the sampling system of the preferred embodiment of the present invention.

FIG. 3 illustrates a block diagram of the sampling system 100 of the preferred embodiment of the present invention. In particular, FIG. 3 illustrates a sampling module or sampler device 102; a programmable counter 104; a low pass filter 106; a direct digital synthesizer (DDS) 110; a pre-scaler 108; a reference clock signal 118 synchronous with the input signal, and a processing unit or CPU 112. In particular, the sampler 102 is coupled to an input communication line 138 by which receives the high speed data waveforms of the input signal to be measured.

As shown in FIG. 3, the programmable counter 104 is coupled to the sampler 102, whereby the counter 104 sends strobe signals 130 to the sampler 102. The low pass filter 106 is coupled to the programmable counter 104. The direct digital sampler (DDS) 110 is coupled to the low pass filter 106. In the preferred embodiment, a pre-scaler 108 is utilized whereby the pre-scaler 108 is coupled to the DDS 110. In the preferred embodiment, the pre-scaler 108 of the apparatus 100 receives the synchronous reference clock signal 118. In an alternative embodiment, the pres-scaler 108 is not utilized and the DDS 110 directly receives the synchronous data clock signal 118. The processing unit 112 is coupled to the DDS 110, whereby the processing unit 112 programs the output of the DDS 110. The processing unit 112 is coupled to the programmable counter 104.

It should also be apparent to one skilled in the art that although the components shown in FIG. 2 are preferred, the present invention is not limited to the components shown nor limited to the configuration of components shown in FIG. 3. It is apparent to one skilled in the art that any other type of synthesizer is alternatively used instead of the DDS 110.

In one embodiment, the synchronous data clock signal 118 is at a frequency which is too high to serve as the frequency to be input into the DDS 110. In this embodiment, the pre-scaler 108 is used to convert the frequency of the clock signal, $F_{CLK}$, to an acceptable reference frequency to be provided to the DDS 110.

The DDS 110 receives the reference clock signal, and generates a high speed analog waveform having frequency, $F_{DDS}$. The frequency of the waveform is preferably programmed by the processing unit or CPU 112, such that the DDS frequency, $F_{DDS}$ is fractionally related to the reference frequency, $F_{CLK}$. This fractional relationship will be described in detail below. The low pass filter 106 removes the high-frequency discrete steps of the waveform from the DDS 110 and provides the smooth analog waveform signal 308 to the programmable counter module 104.

The sampling module 102 preferably operates at sampling rates much lower than the output frequency of the DDS 110, $F_{DDS}$, which must be kept as high as possible to minimize jitter. It is preferred that the $F_{DDS}$ frequency be in the range of ⅛ to ¼ of the clock frequency, although other frequency ranges are contemplated. The programmable counter 104 reduces the sampling rate by performing a number of counts, C, before sending a sampling strobe signal 130 to the sampler 102. Upon receiving the strobe signal 130, the sampling module 102 samples the input waveform 138 and outputs a value 139 representative of the amplitude of the sampled waveform to the CPU 112. The CPU 112 processes the received sampled data 139 and outputs the processed information. As is discussed below, the processor 112 is capable of displaying eye diagrams as well as calculating DCD and ISI jitter components.

Figure 4:
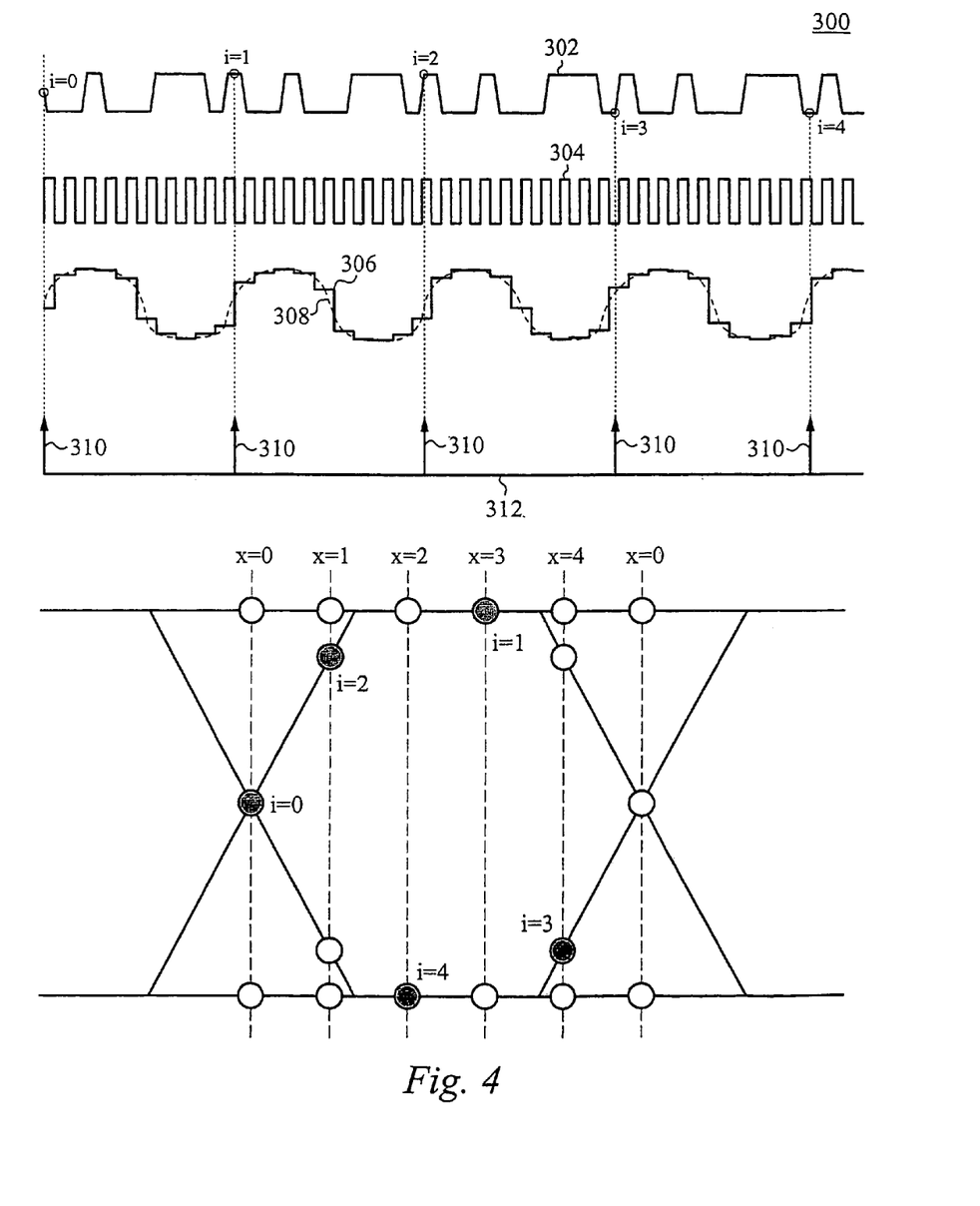
FIG. 4 illustrates a sampling analysis schematic and eye diagram produced by the present invention.

FIG. 4 illustrates a sampling analysis and time-diagram schematic 300 according to the present invention. The incoming waveform signal 302 is preferably a pseudorandum data pattern (PBRS), although any other type of signal having a synchronous clock is contemplated by one skilled in the art. The reference clock signal 304 has a clock frequency, $F_{CLK}$ 304, which is synchronous to the repeating data pattern of the incoming signal 302.

As stated above, the frequency of the clock signal 304, $F_{CLK}$, provided by the data clock 118 is preferably adjusted by the pre-scaling module 108 such that the clock signal 304 is within the allowable range of the DDS 110. The DDS 110 receives the clock signal, $F_{CLK}$ 304, and produces an analog waveform 306 having an output frequency $F_{DDS}$ which is dependent on the clock signal $F_{CLK}$ 304. The output signal generated by the DDS 100 instructs the sampling module 102 to perform a sampling event on the incoming signal 302. The output signal produced by the DDS 110 has a frequency $F_{DDS}$ 306:

$$F_{DDS} = \frac{1}{R} \cdot \left(\frac{N}{N+1}\right) F_{CLK} \quad (1)$$

where R and (N+1) have a power of 2. The variable N is the number of desired sample points to be taken per "unit interval" or period of the $F_{CLK}$ signal, whereby N corresponds to the time resolution of the measurement. The value of R reduces the output frequency of the DDS 110, $F_{DDS}$ to preferalbly less than half of the reference frequency $F_{CLK}$.

The present embodiment preferably employs a 32-bit DDS 110 having a 1 GHz maximum reference frequency. Alternatively, the DDS 110 is any other capacity chip appropriate for use in the present invention. For a 32-bit DDS, the value for N is as large as $2^{29}-1$ for an R value of 8. As an example, to have 2047 point resolution, the DDS output frequency FDDS would be programmed to be (2047÷6384) its input reference frequency Fclk. This corresponds to writing 1FFC0000 to the 32-bit frequency tuning word register of the DDS 110.

Referring back to FIG. 4, the analog signal 306 generated by the DDS 110 is filtered by the low pass filter 106 (FIG. 3) to smooth out the analog signal waveform 306 resulting an analog signal waveform 308. The high speed analog signal waveform 308 generated by the DDS 110 runs at a frequency which is too high to serve as the strobe signals supplied to the sampling module 102 due to the relatively low sampling rates of the sampling module 102. The programmable counter 104 therefore counts C cycles of the $F_{DDS}$ between sending strobe signals 130 to the sampling module 102. Upon receiving the strobe signal 130 from the programmable counter 104, the sampling module 102 initiates the sampling event 312 on the incoming signal 138. Thus, the sampling signal provided by the sampling module 102 has a sampling frequency of $F_{SAMP}$ 310. The relation between the sampling frequency 310 and the DDS frequency as well as the number of counts C is preferably:

$$F_{SAMP} = \frac{F_{DDS}}{C} \quad (2)$$

The sampling frequency as a function of the frequency of the reference clock signal 118 is given by:

$$F_{SAMP} = \frac{1}{R \cdot C} \cdot \left(\frac{N}{N+1}\right) F_{CLK} \qquad (3)$$

The strobe signals 130 sent to the sampling module 102 are represented by the pulse train 312 and occur on the rising edges of the filtered DDS output signal 308 as shown in FIG. 4. The sampling module 102 performs sampling events 310 at i=0, 1, 2, 3, 4. It should be noted that although only five sampling points are shown in FIG. 4, any number of sampling points are alternatively contemplated.

To form the eye diagram from the input signal 138, the CPU 112 rearranges the x coordinate of the $i^{th}$ sample point in a manner according to the following equation:

$$x(i) = \mathrm{mod}(R \cdot C \cdot i, N) \qquad (4)$$

For example, the method in FIG. 4 uses variables R=8, N=5 and C=1 in determining the x-coordinate of the sampling point to be arranged in the eye diagram. As shown in FIG. 4, a series of x coordinates are displayed horizontally from x=0 to x=4 and then back to x=0. Equation 4 is used to determine where on the horizontal axis of the eye diagram the sample point is to be placed. For example, equation 4 is shown below using the sample values i=0 through i=4.

$i=0$: $x=\mathrm{mod}\,(0, 5)=0$ $i=1$: $x=\mathrm{mod}\,(8, 5)=3$ $i=2$: $x=\mathrm{mod}\,(16, 5)=1$ $i=3$: $x=\mathrm{mod}\,(24, 5)=4$ $i=4$: $x=\mathrm{mod}\,(32, 5)=2$ Using equation (4) above, the present system 100 determines the x coordinate for i=0 to be 0. As shown above, for i=1, x is determined to be equal to 3 as shown in the eye diagram in FIG. 4 In addition, for i=2 the x coordinate is determined to be equal to 1. In addition, for sample point i=3, the x coordinate is determined to be equal to 4. In addition, for i=4 the x coordinate, using equation (4), is determined to be equal to 2. For greater values of i, the x coordinates will overlap with the prior x coordinates previously mentioned. For example, for i=5, the x coordinate will be 0 and for i=6, the x coordinate will be 3. Hence the horizontal resolution is limited to N which is 5 points in this example.

It should be noted by one skilled in the art that the values for R, N and C are for example purposes only. It is preferred that the value N be a larger value in the form of $2^x-1$ for an eye diagram that has a higher resolution. In addition, C is preferably a larger number which decreases the sampling rate well below the output frequency of the DDS, $F_{DDS}$. It should be noted that any number is contemplated for the values of R, N and C as to be appropriate for effective handling and processing of high speed signals by the components in the system 100.

The present invention 100 is also able to analyze the deterministic jitter of a data pattern. The hardware embodiment is preferably the system 100 shown in FIG. 3. However, the DDS output frequency, $F_{DDS}$, is programmed to a divided frequency that is synchronous with the reference clock frequency, $F_{CLK}$. In other words, the clock frequency, $F_{CLK}$, divided by the sampling frequency, $F_{SAMP}$ will be an integer number as opposed to a fractional frequency as is used to generate eye diagrams. The system 100 utilizes the clock frequency $F_{CLK}$ as well as the value R determine the DDS frequency. The synthesized frequency is:

$$F_{DDS} = \frac{1}{R} \cdot F_{CLK} \qquad (5)$$

As stated above, the present system 100 utilizes the output frequency, $F_{DDS}$ 306 along with the synchronous clock frequency $F_{CLK}$ and the count C to achieve an appropriate sampling frequency, $F_{SAMP}$.

$$F_{samp} = \frac{1}{R \cdot C} \cdot F_{CLK} \qquad (6)$$

Figure 5:
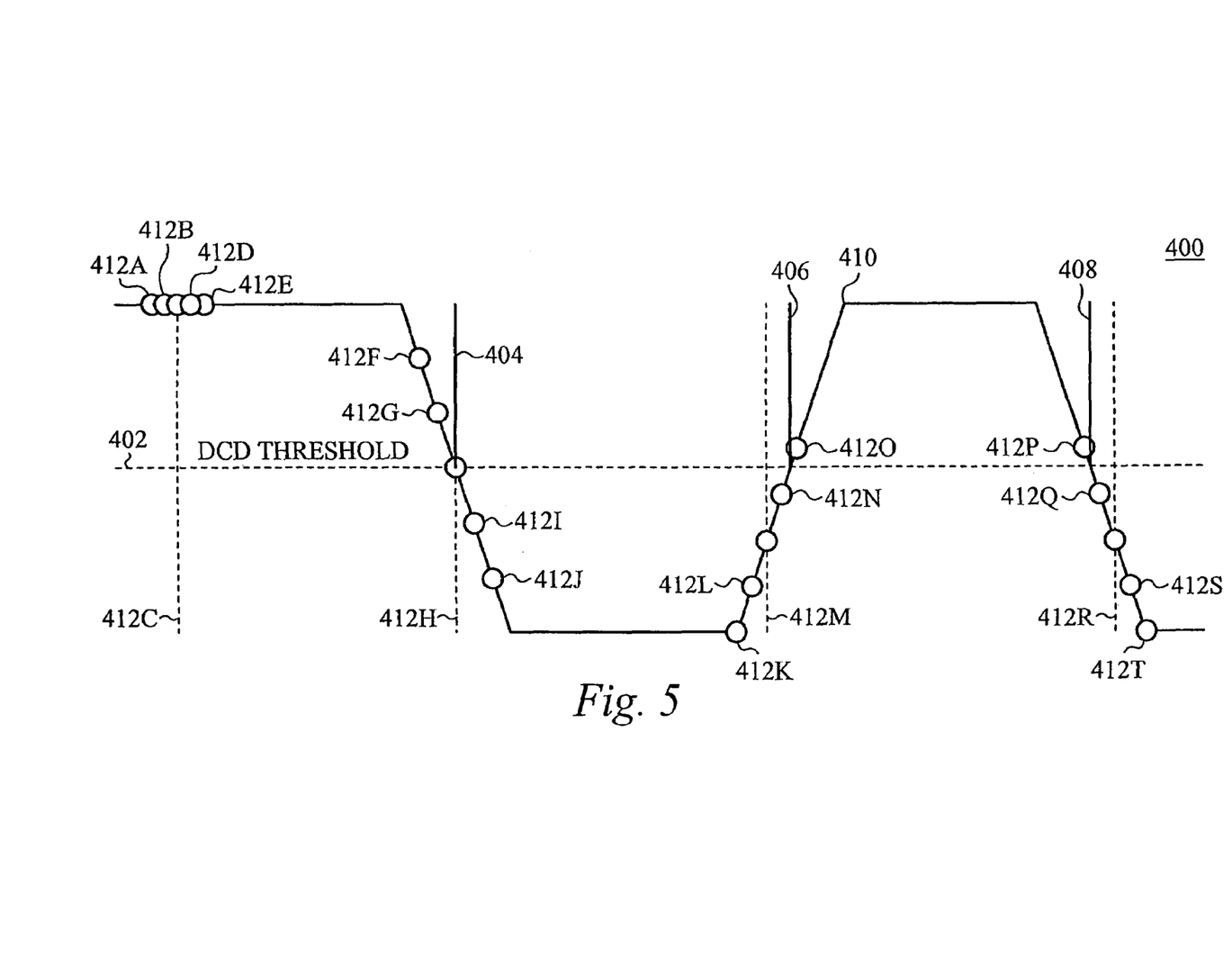
FIG. 5 illustrates a diagram of the input data waveform utilized by the present system for deterministic jitter analysis according to the present invention.

The sampling frequency of the present system 100 allows the sampling events to occur at the same time in the bit period or "unit interval" of the repeating data pattern of the input signal 138. Given that the repeating input data pattern 410 (FIG. 5) has a length of L bits, the bit number of the $i^{th}$ sample point is indexed by the CPU 112 to be:

$$B(i) = \mathrm{mod}(R \cdot C \cdot i, L) \qquad (7)$$

where R is $F_{CLK} \div F_{DDS}$; C is the number of counts; i is the particular sampling point and L is the number of bits in the repeating data pattern 410.

The present system 100 utilizes the phase offset control feature of the DDS 110 which adjusts the sample points to be on the rising and falling edges of the received bit stream 138 (FIG. 3). After one sample point has been taken on each edge of the input signal, the phase is shifted slightly and an adjacent sample point is taken on each edge. After the shifted sample point is taken on each edge, the phase is shifted further and another adjacent point is taken on each edge and so on. In this manner a collection of sample points are gathered that are localized on the edges of the incoming data pattern.

FIG. 5 illustrates a collection of sample points that have been collected along the edges of the incoming data stream 400 in the manner described above. A small portion of the bit stream 400 is shown for improved clarity.

As long as bit length, L, has no common factors with R and C, the edges of the data pattern will be sampled equally. As an example, where R=8, C=1024, L=127, the present system utilizes equation (7) to determine the bit edge locations for each sampling point.

The $0^{th}$ sample point will correspond to the mod(0,127) $=0^{th}$ edge.

The $1^{th}$ sample point will correspond to the mod(8192, 127)=$64^{th}$ edge.

The $2^{nd}$ sample point will correspond to the mod(16384, 127)=$1^{st}$ edge.

The $3^{rd}$ sample point will correspond to the mod(16384, 127)=$65^{th}$ edge.

The $125^{th}$ sample point will correspond to the mod(16384, 127)=$126^{th}$ edge.

The $126^{th}$ sample point will correspond to the mod (1032192,127)=$63^{rd}$ edge.

The $127^{th}$ sample point will correspond to the mod (1040384,127)=$0^{th}$ edge.

The above pattern will repeat indefinitely such that many sample points can be collected along each edge.

The present system preferably utilizes a 32-bit DDS with 14-bit phase offset adjustment resolution. This yields a phase resolution of 0.022 degrees or 0.6 psec at a 100 MHz output frequency $F_{DDS}$. It is contemplated by one skilled in the art that any other appropriate DDS is alternatively used to perform the present technique discussed herein.

As shown in FIG. 5, the present system 100 takes sample points 412A-412E on the transition of the data waveform between the 1$^{st}$ and 2$^{nd}$ bits. In addition, the present system 100 takes sample points 412F-412J on the transition edge of the data waveform between the 2$^{nd}$ and 3$^{rd}$ bits as well as sample points 412K-412O on the transition edge between the 3$^{rd}$ and 4$^{th}$ bits. The present system 100 also takes sample points 412P-412T along the transition edge of the data waveform between the 4$^{th}$ and 5$^{th}$ bits. It should be noted that the collection of sampling points shown in FIG. 5 are for example purposes and are not limited to the positioning and numbering shown therein.

The edge sample points are interpolated by the processing unit 112 to determine the exact location where the DCD threshold 402 crosses the edges of the sampled signal 410. To determine the deterministic jitter in the signal, the system calculates the time discrepancy between the actual edge locations and the ideal edge locations. In the edge diagram shown in FIG. 5, the actual edge crossings are shown at 404, 406 and 408. In the edge diagram, the ideal edge crossings or bit transitions are located at points 412H, 412M and 412R. Sampling point 412C falls between two bits of the same value and therefore does not fall on a transition or edge. However, sample points 404, 406 and 408 are located on actual edge crossings. Sampling point 404 is the ideal edge crossing point which is determined by the system interpolating sampling points 412F through 412J. Similarly, Sampling point 406 is shown in FIG. 5 as the ideal edge crossing which is determined by interpolating sampling points 412K through 412O. In addition, sampling point 408 is shown as the ideal edge crossing obtained by interpolating points 412P through 412T.

The system can average multiple sample points at each location to remove the effects of random jitter present in the signal. The present system is able the determine the time discrepancy between the ideal edge crossings 412H, 412M and 412R and the actual edge crossings 404, 406 and 408 to calculate the deterministic jitter of the input signal 410. In particular, the present system is able to calculate duty cycle distortion (DCD) jitter as well as intersymbolic interference (ISI) jitter from the signal 410. The method of calculating DCD and ISI jitter is well known in the art and is not discussed in any more detail herein.

The foregoing description of preferred embodiments of the present invention has been provided for the purposes of illustration and description. It is not intended to be exhaustive or to limit the invention to the precise forms disclosed. Many embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed:

1. An apparatus for sampling an input signal, wherein the apparatus receives a clock signal synchronous with the input signal, the apparatus comprising:

a synthesizer for receiving the synchronous clock signal, wherein the synthesizer produces a synthesized signal having a synthesized signal frequency dependent on the synchronous clock signal;

a sampling module coupled to the synthesizer, wherein the sampling module samples the input signal based on the synthesized signal frequency; and a processing unit coupled to the sampling module, wherein the processing unit analyzes a sampled point from the sampling module and arranges the sampled point in an eye diagram;

wherein the synthesized signal frequency $F_{DDS}$ is programmed as the function $$F_{DDS} = \frac{1}{R} \cdot \left(\frac{N}{N+1}\right) F_{CLK}$$

wherein R is an integer, N is an amount of sample points per unit interval and $F_{CLK}$ is the clock frequency of the synchronous clock signal or a frequency scaled from the synchronous clock signal; and wherein the eye diagram is formed by arranging an x-coordinate of a particular sample point using the function:

$$x(i) = \mathrm{mod}(R \cdot C \cdot i, N)$$

wherein C is the predetermined number of counts and i is the particular sample point.

2. A method of analyzing an input signal comprising:

receiving a clock signal synchronous with the input signal;

generating a synthesized signal from the clock signal, wherein the synthesized signal has a synthesized signal frequency;

sampling the input signal dependent on the synthesized signal frequency;

adjusting the clock signal to an acceptable clock frequency to generate the synthesized signal;

wherein the input signal is sampled at a sampling point after a predetermined number of counts, C;

wherein the synthesized signal frequency $F_{DDS}$ is a function:

$$F_{DDS} = \frac{1}{R} \cdot \left(\frac{N}{N+1}\right) F_{CLK}$$

wherein R is an integer, N is a number of sample points per unit interval and $F_{CLK}$ is the frequency of the synchronous clock signal or a frequency scaled from the synchronous clock signal; and arranging an i$^{th}$ sampling point to form an eye diagram with horizontal resolution of N points per unit interval using function:

$$x(i) = \mathrm{mod}(R \cdot C \cdot i, N)$$

* * * * *